(12) United States Patent
Lee

(10) Patent No.: US 11,454,863 B2
(45) Date of Patent: Sep. 27, 2022

(54) CAMERA MODULE

(71) Applicant: Samsung Electro-Mechanics Co., Ltd., Suwon-si (KR)

(72) Inventor: Jung Hoo Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 685 days.

(21) Appl. No.: 16/448,447

(22) Filed: Jun. 21, 2019

(65) Prior Publication Data
US 2020/0012169 A1 Jan. 9, 2020

(30) Foreign Application Priority Data
Jul. 9, 2018 (KR) .................. 10-2018-0079597

(51) Int. Cl.
G02B 27/64 (2006.01)
G02B 7/09 (2021.01)
G03B 5/00 (2021.01)
G03B 13/36 (2021.01)

(52) U.S. Cl.
CPC ............. *G03B 5/00* (2013.01); *G02B 7/09* (2013.01); *G02B 27/646* (2013.01); *G03B 13/36* (2013.01); *G03B 2205/0007* (2013.01); *G03B 2205/0076* (2013.01)

(58) Field of Classification Search
CPC .. G03B 5/00; G03B 13/36; G03B 2205/0007; G03B 2205/0076; G02B 7/09; G02B 27/646
See application file for complete search history.

(56) References Cited

U.S. PATENT DOCUMENTS

| 8,830,335 | B2 | 9/2014 | Topliss et al. |
| 8,866,918 | B2* | 10/2014 | Gregory ............. H04N 5/23287 348/208.99 |
| 9,518,566 | B2 | 12/2016 | Eddington et al. |
| 2010/0283887 | A1 | 11/2010 | Topliss et al. |
| 2011/0091193 | A1 | 4/2011 | Lim et al. |

(Continued)

FOREIGN PATENT DOCUMENTS

| CN | 101893748 A | 11/2010 |
| CN | 101896719 A | 11/2010 |

(Continued)

OTHER PUBLICATIONS

Chinese Office Action dated Mar. 31, 2022, in counterpart Chinese Patent Application No. 201910609179.3 (5 pages in English, 7 pages in Chinese).

*Primary Examiner* — Robert E. Tallman
(74) *Attorney, Agent, or Firm* — NSIP Law

(57) ABSTRACT

A camera module includes a support structure having an internal space, a movable body disposed in the internal space of the support structure, and a plurality of driving wires supporting the movable body in the internal space of the support structure and configured to move the movable body relative to the support structure, each of the driving wires being made of a shape-memory alloy and having one end connected to the support structure, and another end connected to the movable body. An angle between the movable body and each of the driving wire is maintained at 15.5° or less at all positions to which the movable body is movable by the driving wires.

20 Claims, 10 Drawing Sheets

(56) References Cited

U.S. PATENT DOCUMENTS

| | | |
|---|---|---|
| 2013/0162896 A1 | 6/2013 | Kang et al. |
| 2015/0135703 A1 | 5/2015 | Eddington et al. |
| 2015/0322929 A1 | 11/2015 | Morikawa et al. |
| 2017/0285362 A1 | 10/2017 | Hu et al. |
| 2018/0321503 A1 | 11/2018 | Brown |

FOREIGN PATENT DOCUMENTS

| | | |
|---|---|---|
| CN | 102043222 A | 5/2011 |
| CN | 103176256 A | 6/2013 |
| CN | 104335101 A | 2/2015 |
| CN | 108141541 A | 6/2018 |
| KR | 10-2015-0013555 A | 2/2015 |
| KR | 10-1770856 B1 | 9/2017 |
| KR | 10-2018-0009467 A | 1/2018 |
| WO | WO 2011/104518 A1 | 9/2011 |
| WO | WO 2013/118601 A1 | 8/2013 |
| WO | WO 2013/175197 A1 | 11/2013 |

\* cited by examiner

A

B

CAMERA MODULE

CROSS-REFERENCE TO RELATED APPLICATIONS

This application claims the benefit under 35 USC 119(a) of Korean Patent Application No. 10-2018-0079597 filed on Jul. 9, 2018, in the Korean Intellectual Property Office, the entire disclosure of which is incorporated herein by reference for all purposes.

BACKGROUND

1. Field

This application relates to a camera module.

2. Description of Related Art

Recently, camera modules have typically been provided in portable electronic devices such as smartphones, tablet personal computers (PCs), and laptop computers, and an autofocusing (AF) function, an optical image stabilization (OIS) function, and a zoom function have typically been added to camera modules for such portable electronic devices.

However, to implement such functions, structures of camera modules have become relatively complex and sizes of the camera modules have increased, making it difficult to mount the camera modules in portable electronic devices.

As the smartphone camera market has grown, there have been attempts to miniaturize and integrate functions of typical manual cameras such as autofocusing (AF) and optical zoom with an OIS function. These attempts have created a demand for new OIS driving methods that enable easier miniaturization and integration than existing OIS driving methods.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a camera module includes a support structure having an internal space; a movable body disposed in the internal space of the support structure; and a plurality of driving wires supporting the movable body in the internal space of the support structure and configured to move the movable body relative to the support structure, each of the driving wires being made of a shape-memory alloy and having one end connected to the support structure, and another end connected to the movable body, wherein an angle between the movable body and each of the driving wires is maintained at 15.5° or less at all positions to which the movable body is movable by the driving wires.

The driving wires may include four groups of driving wires, and each of the groups of driving wires may include two driving wires.

Each of the two driving wires of each of the four groups of driving wires may have the one end connected to an internal side surface or a bottom surface of the support structure, and the other end connected to a side surface of the movable body near or adjacent to an upper edge of the movable body.

The camera module may further include a ball disposed between a bottom surface of the support structure and the movable body.

The movable body may have a plurality of side surfaces, and may include a plurality of pairs of clips, each of the pairs of clips being disposed on a respective one of the side surfaces of the movable body; and a plurality of support members each being slidably mounted in a respective pair of the pairs of clips, and each of the driving wires may have the one end connected to the support structure, and the other end connected to a respective end of a respective one of the support members.

An angle between each of the driving wires and the support member may be maintained at 15.5° or less at all positions to which the movable body is movable by the driving wires.

Each of the side surfaces of the movable body may have a guide hole formed therein, and each of the support members may include a projection inserted into the guide hole formed in a respective one of the side surfaces of the movable body.

The movable body may have a plurality of side surfaces, and may include a plurality of support members each mounted at a fixed position on a respective one of the side surfaces of the movable body, and each of the driving wires may have the one end connected to the support structure, and the other end connected to a respective one of the support members.

Each of the side surfaces of the movable body may have a mounting hole formed therein, and each of the support members may include a mounting projection inserted into the mounting hole formed in a respective one of the side surfaces of the movable body to mount the support member at the fixed position on the side surface of the movable body.

The movable body may have four sides, and may include a first spring member connected to a first side and a second side of the movable body opposing each other; and a second spring member connected to a third side and a fourth side of the movable body opposing each other, first driving wires of the driving wires may have the one end connected to the support structure, and the other end connected to the first spring member, and second driving wires of the driving wires may have the one end connected to the support structure, and the other end connected to the second spring member.

Each of the first spring member and the second spring member may have a rectangular annular shape and surround the movable body.

The other end of each of the driving wires connected to the first spring member may be connected to a respective portion of the first spring member opposing the third side or the fourth side of the movable body to which the other end of the second spring member is connected, and the other end of each of the driving wires connected to the second spring member may be connected to a respective portion of the second spring member opposing the first side or the second side of the movable body to which the other end of each of the first spring member is connected.

The movable body may have a plurality of side surfaces, and each of the driving wires may be connected to a respective one of the side surfaces of the movable body so that each of the side surfaces of the movable body has a single one of the driving wires connected thereto.

The movable body may include a plurality of mounting tools each disposed on a respective one of the side surfaces of the movable body, and each of the driving wires may be connected to a respective one of the mounting tools.

A length of the driving wire projected onto a plane parallel to an internal side surface of the support structure 220 may be equal to 3.5 millimeters (mm), and a length of a gap between the movable body and the support structure may range from 0.3 mm to 0.7 mm according to contraction and relaxation of each of the driving wires.

In another general aspect, a camera module includes a support structure having an internal space; a movable body disposed in the internal space of the support structure; and a plurality of driving wires supporting the movable body in the internal space of the support structure and configured to move the movable body relative to the support structure, each of the driving wires being made of a shape-memory alloy and having one end connected to the support structure, and another end connected to the movable body, wherein each of the driving wires is configured to be elongated to move the movable body in one of three axis directions.

In another general aspect, a camera module includes a support structure having an internal space; a movable body disposed in the internal space of the support structure; and a plurality of driving wires supporting the movable body in the internal space of the support structure and configured to move the movable body in a first axis direction and a second axis direction relative to the support structure, each of the driving wires being made of a shape-memory alloy and having one end connected to the support structure, and another end connected to the movable body, wherein first driving wires of the driving wires are operable to move the movable body only in the first axis direction, and second driving wires of the driving wires are operable to move the movable body only in the second axis direction.

The other ends of the first driving wires may be connected to the movable body so that the first driving wires do not move as the second driving wires move the movable body in the second axis direction, and the other ends of the second driving wires may be connected to the movable body so that the second driving wires do not move as the first driving wires move the movable body in the first axis direction.

The movable body may have a first side surface and a second side surface on opposite sides of the movable body and oriented perpendicular to the first axis direction, and a third side surface and a fourth side surface on opposite sides of the movable body and oriented perpendicular to the second axis direction, the movable body may include four support members each slidably mounted on a respective one of the first, second, third, and fourth side surfaces of the movable body, the first driving wires may include two driving wires having their other ends connected to opposite ends of the support member slidably mounted on the first side surface of the movable body, and two driving wires having their other ends connected to opposite ends of the support member slidably mounted on the second side surface of the movable body, and the second driving wires may include two driving wires having their other ends connected to opposite ends of the support member slidably mounted on the third side surface of the movable body, and two driving wires having their other ends connected to opposite ends of the support member slidably mounted on the fourth side surface of the movable body.

The support members slidably mounted on the first and second side surfaces of the movable body may be configured to slide relative to the movable body to remain stationary relative to the support structure as the second driving wires move the movable body in the second axis direction, and the support members slidably mounted on the third and fourth side surfaces of the movable body may be configured to slide relative to the movable body to remain stationary relative to the support structure as the first driving wires move the movable body in the first axis direction.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
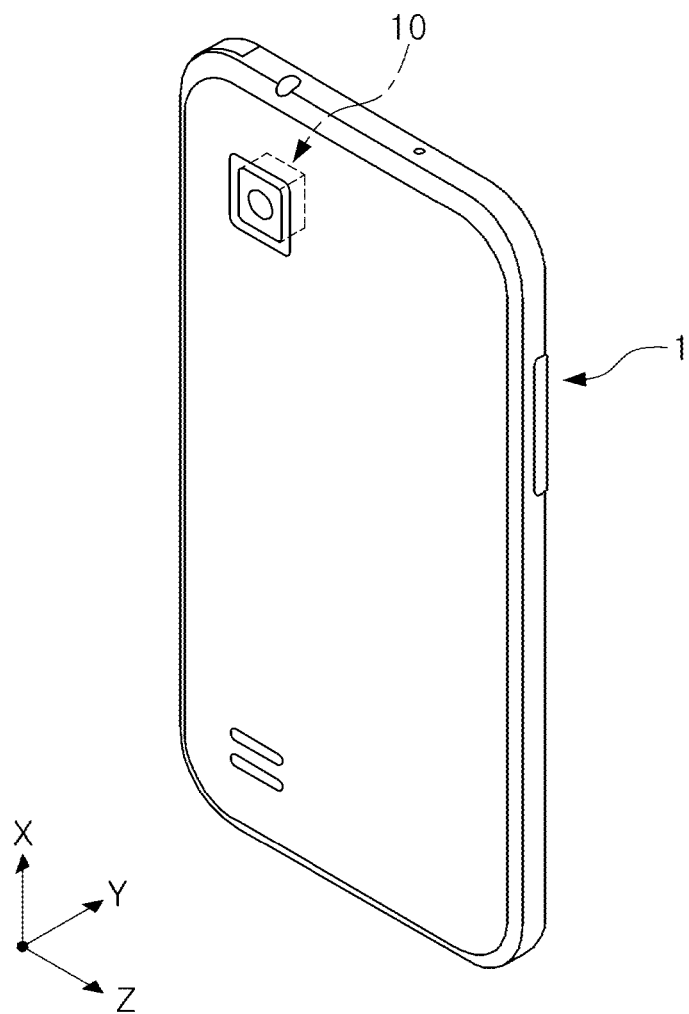
FIG. 1 is a perspective view of an example of a portable electronic device.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated by 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

FIG. 1 is a perspective view of an example of a portable electronic device.

Referring to FIG. 1, a portable electronic device 1 may be a mobile communications terminal, a smartphone, or a tablet personal computer (PC) in which a camera module 10 is mounted.

The portable electronic device 1 is provided with the camera module 10 as illustrated in FIG. 1 to capture an image of a subject.

The camera module 10 includes a plurality of lenses, and an optical axis of the lenses (a Z-axis of the lenses) is oriented in a thickness direction of the portable electronic device 1 (a Y-axis direction of the portable electronic device 1), i.e., in a direction from a front surface of the portable electronic device 1 to a rear surface thereof, or in an opposite direction from the front surface of the portable electronic device to the rear surface thereof.

As will be described later, the camera module 10 is configured so that autofocusing (AF) or optical image stabilization (OIS) is performed by driving wires 160 (see FIGS. 2 and 3).

Figure 2:
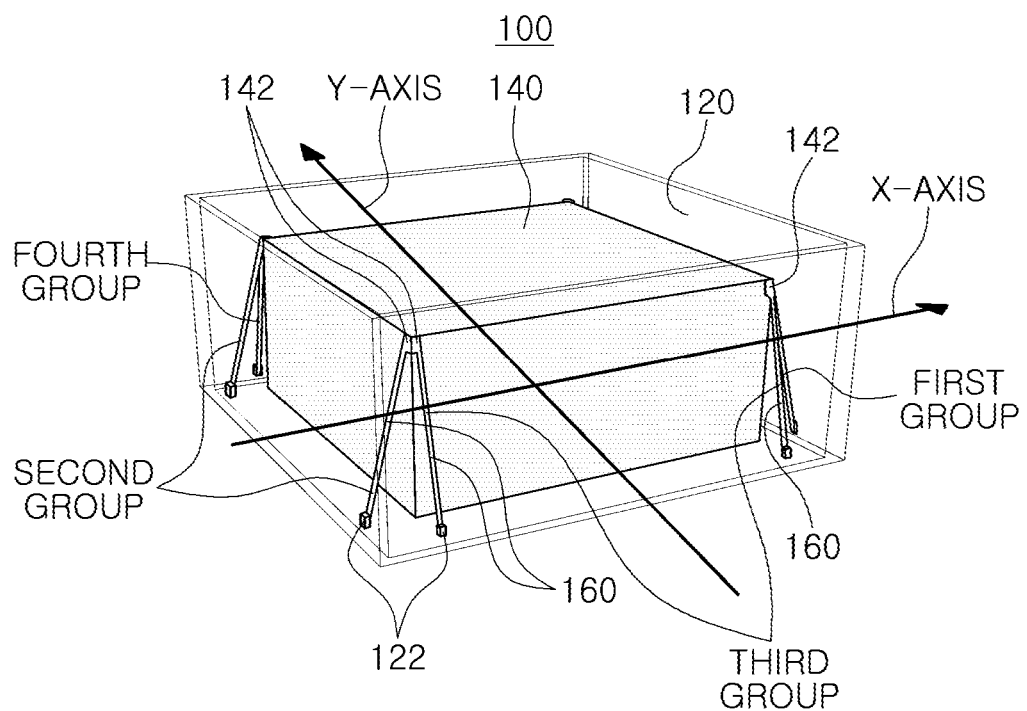
FIG. 2 is a schematic perspective view of an example of a camera module.
Figure 3:
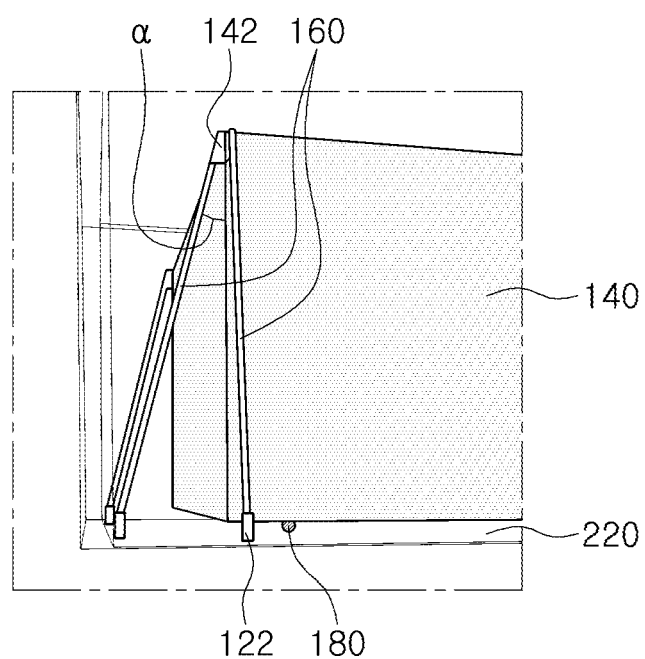
FIG. 3 is an enlarged perspective view of a portion of the camera module of FIG. 2.

FIG. 2 is a schematic perspective view of an example of a camera module, and FIG. 3 is an enlarged perspective view of a portion of the camera module of FIG. 2.

Referring to FIGS. 2 and 3, a camera module 100 includes a support structure 120, a movable body 140, driving wires 160, and a ball 180.

The support structure 120 has an internal space. As an example, the support structure 120 has a hexahedral shape with a top and a bottom that are at least partially open. For example, the support structure 120 may have a through-hole, not illustrated, in a bottom surface thereof, and may be fixedly mounted on a printed circuit board, not illustrated, or other mounting surface so that an image sensor, not illustrated, mounted on the printed circuit board or other mounting surface is disposed underneath the through-hole.

Internal side surfaces of the support structure 120 are provided with installation tools 122 to which the driving wires 160 are connected. The number of installation tools 122 is equal to the number of driving wires 160. As an example, the installation tools 122 are disposed on the internal side surfaces of the support structure 120 near or adjacent to bottom edges of the internal side surfaces of the support structure 120. Alternatively, the installation tools 122 may be disposed on a bottom surface of the support structure 120 near or adjacent to the internal side surfaces of the support structure 120.

The movable body 140 is movably disposed in the internal space of the support structure 120. As an example, the movable body 140 may be a lens barrel in which a plurality of lenses, not illustrated, are mounted. The movable body 140 has a substantially hexahedral shape. Side surfaces of the movable body 140 are provided with mounting tools 142 to which the driving wires 160 are connected near or adjacent to upper edges of the movable body 140.

A plurality of the driving wires 160 are provided. Each driving wire 160 has one end connected to the support structure 120, and another end connected to the movable body 140. The driving wire 160 is made of a shape-memory alloy. As an example, among the plurality of the driving wires 160, a pair of driving wires 160 constitutes a group of driving wires 160, and four groups of driving wires 160 are provided, with one group disposed on each side of the movable body 140.

As an example, each driving wire 160 has one end connected to an installation tool 122 disposed on an internal side surface of the support structure 120 near or adjacent to a bottom edge of the internal side surface of the support structure 120, and another end connected to a mounting tool 142 disposed on a side surface of the movable body 140 near or adjacent to an upper edge of the movable body 140. Alternatively, the installation tool 122 may be disposed on a bottom surface of the support structure 120 near or adjacent to the internal side surface of the support structure 120. Two driving wires 160 are connected to each side surface of the movable body 140. Each of the driving wires 160 is operable to move the movable body 140 in one axis direction, such as an X-axis direction, a Y-axis direction, or a Z-axis direction. That is, each of the driving wires 160 is not operable to move the movable body 140 in two or more axis directions, but is operable to move the movable body 140 in only one axis direction.

An angle α between the movable body 140 and each driving wire 160 is maintained at 15.5° or less at all positions to which the movable body 140 is movable. For example, assuming that a length of the driving wire 160 is the hypotenuse of a right triangle, the length of the driving wire 160 projected onto a plane parallel to an internal side surface of the support structure 120 is one leg of the right triangle, and a length of a gap between the movable body 140 and the support structure 120 is the other leg of the right triangle, an angle α between the driving wire 160 and the side surface of the movable body 140 as illustrated in FIG. 3 is maintained at 15.5° or less at all positions to which the movable body 140 is movable.

The above feature will now be described in further detail.

Figure 4:
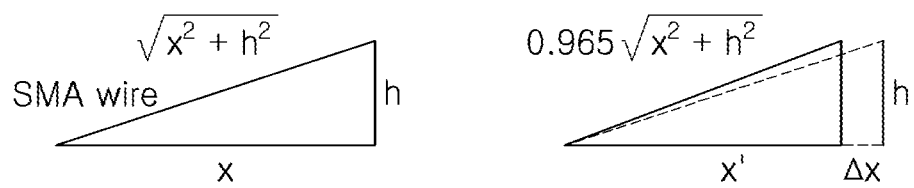
FIG. 4 illustrates a stroke of a movable body (a change in a position of the movable body) produced by a change in a length of a driving wire.

FIG. 4 illustrates a stroke of a movable body (a change in a position of the movable body) produced by a change in a length of a driving wire.

Referring to FIG. 4, a right triangle has a height h, a base x, and a hypotenuse $\sqrt{(x^2+y^2)}$. The hypotenuse of the right triangle is a length of the driving wire 160, the height h of the right triangle is the length of the driving wire 160 projected onto a plane parallel to an internal side surface of the support structure 120, and the base x of the right triangle is a length of the gap between the movable body 140 and the support structure 120.

When the length of the driving wire 160 (the hypotenuse $\sqrt{(x^2+y^2)}$ of the right triangle) is decreased by 3.5% to a new length $0.965\sqrt{(x^2+y^2)}$ while the length of the driving wire 160 projected onto the plane parallel to the internal side surface of the support structure 120 (the height h of the right triangle) remains constant, the length x of the gap between the movable body 140 and the support structure decreases to a new length x', and the angle between the driving wire 160 and the side surface of the movable body 140 decreases. A change Δx in the length x is equal to x−x', and is called a stroke. The stroke Δx is a change in a position of the movable body 140 in a direction perpendicular to the side surface of the movable body 140 in response to the change in the length of the driving wire 160. The stroke Δx may be expressed by Equation 1 below.

$$\text{stroke} = \Delta x = x - \sqrt{\left(0.965\sqrt{x^2+h^2}\right)^2 - h^2} \quad (1)$$

In the above Equation 1, the value of the square root term that is subtracted from x is the new length x'. As explained below, Equation 1 may be rewritten to eliminate h based on an equation expressing an angle θ between the driving wire 160 and the movable body 140 in terms of x and h.

Figure 5:
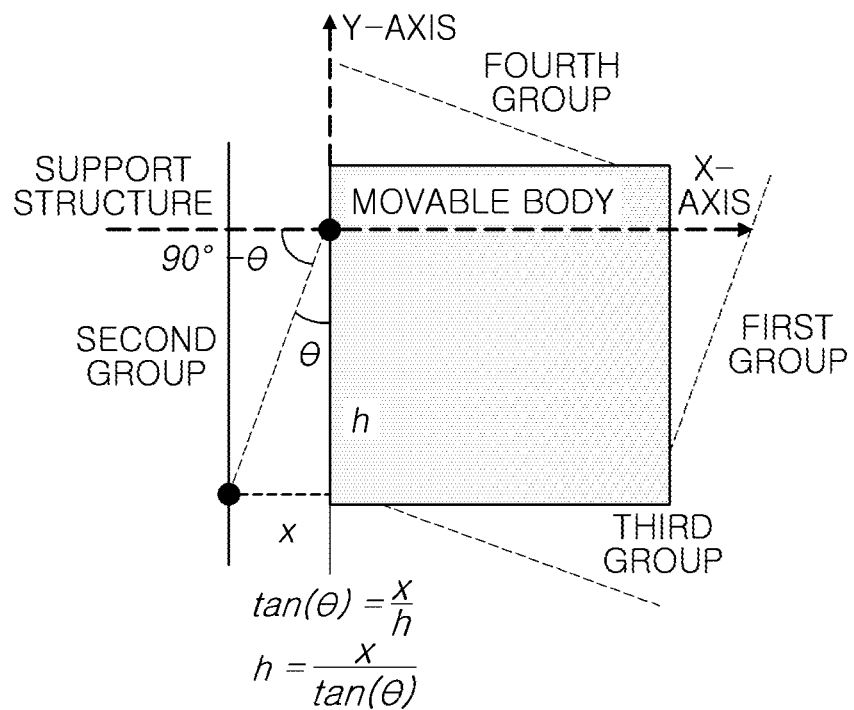
FIG. 5 illustrates an angle between a driving wire and a side surface of a movable body.

FIG. 5 illustrates an angle between a driving wire and a side surface of a movable body.

FIG. 5 shows a right triangle having a hypotenuse that is a length of the driving wire 160 connecting the support structure 120 and the movable body 140 to each other, a height h that is the length of the driving wire 160 projected onto a plane parallel to an internal side surface of the support structure 120, and a base x that is a length of the gap between the movable body 140 and the support structure 120. An angle between the driving wire 160 and the side surface of the movable body 140 is θ. A relationship between θ, x, and h may be expressed by an equation tan(θ)=x/h, which may be rewritten as an equation h=x/tan(θ).

By replacing h in Equation 1 above with x/tan(θ) based on the equation h=x/tan(θ), Equation 1 may be rewritten as Equation 2 below.

$$\text{stroke} = \Delta x \quad (2)$$

$$\Delta x = x - \sqrt{\left(0.965\sqrt{x^2+h^2}\right)^2 - h^2}$$

$$= x - \sqrt{\left(0.965\sqrt{x^2+\frac{x}{\tan(\theta)}2}\right)^2 - \left(\frac{x}{\tan(\theta)}\right)^2}$$

Figure 6:
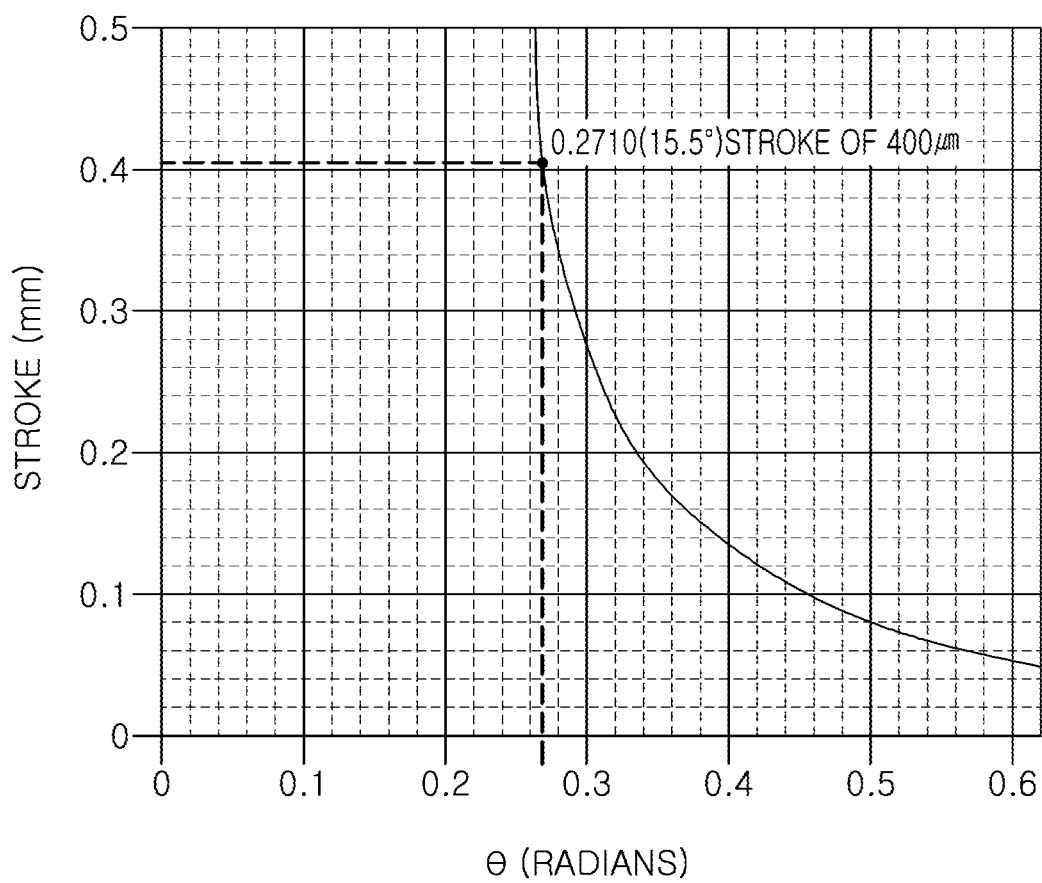
FIG. 6 illustrates a graph of an equation representing a relationship between an angle between a driving wire and a side surface of a movable body, and a stroke of the movable body (a change in the position of the movable body relative to a starting position of the movable body) produced by a fixed change in a length of the driving wire.

FIG. 6 illustrates a graph of an equation representing a relationship between an angle between a driving wire and a side surface of a movable body, and a stroke of the movable body (a change in the position of the movable body relative to a starting position) produced by a fixed change in a length of the driving wire.

The above Equation 2 represents a relationship between the angle θ between the driving wire 160 and the side surface of the movable body 140, and the stroke Δx of the movable body 160 (a change in a position of the movable body 160 relative to a starting position x of the movable body) produced by a fixed change of 3.5% in the length of the driving wire 160.

The variable x in Equation 2 represents a starting position of the movable body 140 relative to the support structure 120, that is, the length x of a gap between the side surface of the movable body 140 and the support structure 120 before length of the driving wire 160 is contracted by 3.5%. Assuming that x=0.5 mm, meaning that the gap between the side surface of the movable body 140 and the support structure 120 is 0.5 mm before the length of the driving wire is contracted by 3.5%, Equation 2 has a graph illustrated in FIG. 6.

In the graph in FIG. 6, 0.2710 is an angle θ expressed in radians that is equal to 15.5272°, or 15.5° rounded to one decimal place, and corresponds to a stroke Δx of 400 μm. Thus, the movable body 140 may be moved by up to 400 μm from the starting position of x=0.5 mm in an X-axis direction or a Y-axis direction without the angle θ between the driving wire 160 and the movable body 140 exceeding 15.5°. That is, if the movable body 140 is moved by 400 μm from the starting position x=0.5 mm, the angle θ between the driving wire 160 and the movable body 140 will be equal to 15.5°. If the movable body 140 is moved by less than 400 μm from the starting position x=0.5 mm, the angle θ between the driving wire 160 and the movable body 140 will be less than 15.5°.

As illustrated in FIG. 2, only first and second groups of driving wires 160 need to be operated to move the movable body 40 in the X-axis direction, and only third and fourth groups of driving wires 160 need to be operated to move the movable body 140 in the Y-axis direction.

As an example, when the movable body 140 has a height of 3.5 mm, that is, when the length of the driving wire 160 projected on the side surface of the movable body 140 is 3.5 mm, the movable body 140 and the support structure 120 are disposed so that their centers are aligned with each other, and a gap between the movable body 140 and the support structure 120 is 0.5 mm, the driving wire 160 will have a length of 3.536 mm. When the driving wire 160 moves the movable body 140 to a maximum position in the X-axis direction or the Y-axis direction to increase the gap between the movable body 140 and the support structure 120 from 0.5 mm to 0.7 mm, corresponding to a stroke Δx of 0.2 mm or 200 μm, the driving wire 160 is elongated to have a length of 3.569 mm. When the driving wire 160 moves the movable body 140 to a minimum position in the X-axis direction or the Y-axis direction to decrease the gap between the movable body 140 and the support structure 120 from 0.5 mm to 0.3 mm, corresponding to a stroke Δx of 0.2 mm or 200 μm, the driving wire 160 is contracted to have a length of 3.513 mm.

The driving wire 160 has a maximum length of 3.575 mm when the movable body 140 is moved to the maximum position in the X-axis direction (or the Y-axis direction) to increase the gap between the movable body 140 and the support structure 120 from 0.5 mm to 0.7 mm in the X-axis direction (or the Y-axis direction), and is also moved to the maximum position in the Y-axis direction (or the X-axis direction) to increase the gap between the movable body 140 and the support structure 120 from 0.5 mm to 0.7 mm in the Y-axis direction (or the X-axis direction), so that the center of the movable body 140 is disposed at a maximum distance from the center of the support structure 120.

When the center of the movable body 140 is disposed at the maximum distance from the center of the support structure 120, the driving wire 160 is the hypotenuse of a first right triangle having a height of 3.5 mm and a base that is the hypotenuse of a second right triangle having legs that are the 0.7 mm gap between the movable body 140 and the support structure 120 in the X-axis direction (or the Y-axis direction), and the 0.2 mm distance the movable body 140 was moved in the Y-axis direction (or the X-axis direction to increase the gap between the movable body 140 and the support structure 120 from 0.5 mm to 0.7 mm in the Y-axis direction (or the X-axis direction). Thus, the hypotenuse of the second right triangle is $\sqrt{(0.7^2+0.2^2)}=0.728$ mm, and the hypotenuse of the first right triangle, which is equal to the maximum length of the driving wire 160, is $\sqrt{(3.5^2+0.728^2)}=3.575$ mm.

Accordingly, the maximum length of 3.575 mm of the driving wire 160 is relaxed by 1.8% relative to the length of 3.513 mm of the driving wire 160 when the driving wire 160 is most contracted. That is, 3.575/3.513=1.018, and 1.018−1.000=0.018, or 1.8%.

When applied to a small-sized camera structure, the example described above enables the movable body 140 to move 0.2 mm in each direction relative to a center position, or a total of 0.4 mm from a minimum position to a maximum position, at a contraction rate of the driving wire 160 of 3.5% or less.

When the movable body 140 is moved to the maximum position in the X-axis direction and is also moved to the maximum position in the Y-axis direction so that the driving wire 160 has the maximum length of 3.575 mm described above, an angle α between the driving wire 160 disposed to drive the movable body 140 in the X-axis direction and a side surface of the movable body 140 is 11.7°. The angle of α=11.7° can be obtained by calculating α=$\tan^{-1}(0.728/3.5)$, where 0.728 and 3.5 are the values of 0.728 mm and 3.5 mm discussed above in connection with the maximum length of 3.575 mm of the driving wire 160. Thus, the angle α between the driving wire 160 and the side surface of the movable body 140 is maintained at less than 15.5°.

The ball 180 is disposed between an internal bottom surface of the support structure 120 and a bottom surface of the movable body 140. The ball 180 enables the movable body 140 to move more smoothly. Although only one ball 180 is illustrated in FIG. 3, a plurality of balls 180 may be disposed between the internal bottom surface of the support structure 120 and the bottom surface of the movable body 140. For example, four balls 180 may be rollably mounted on the bottom surface of the movable body 140.

As described above, the movable body 140 is driven by the plurality of driving wires 160 made of a shape-memory alloy. This enables the manufacturing costs of the camera module 100 to be reduced.

Figure 7:
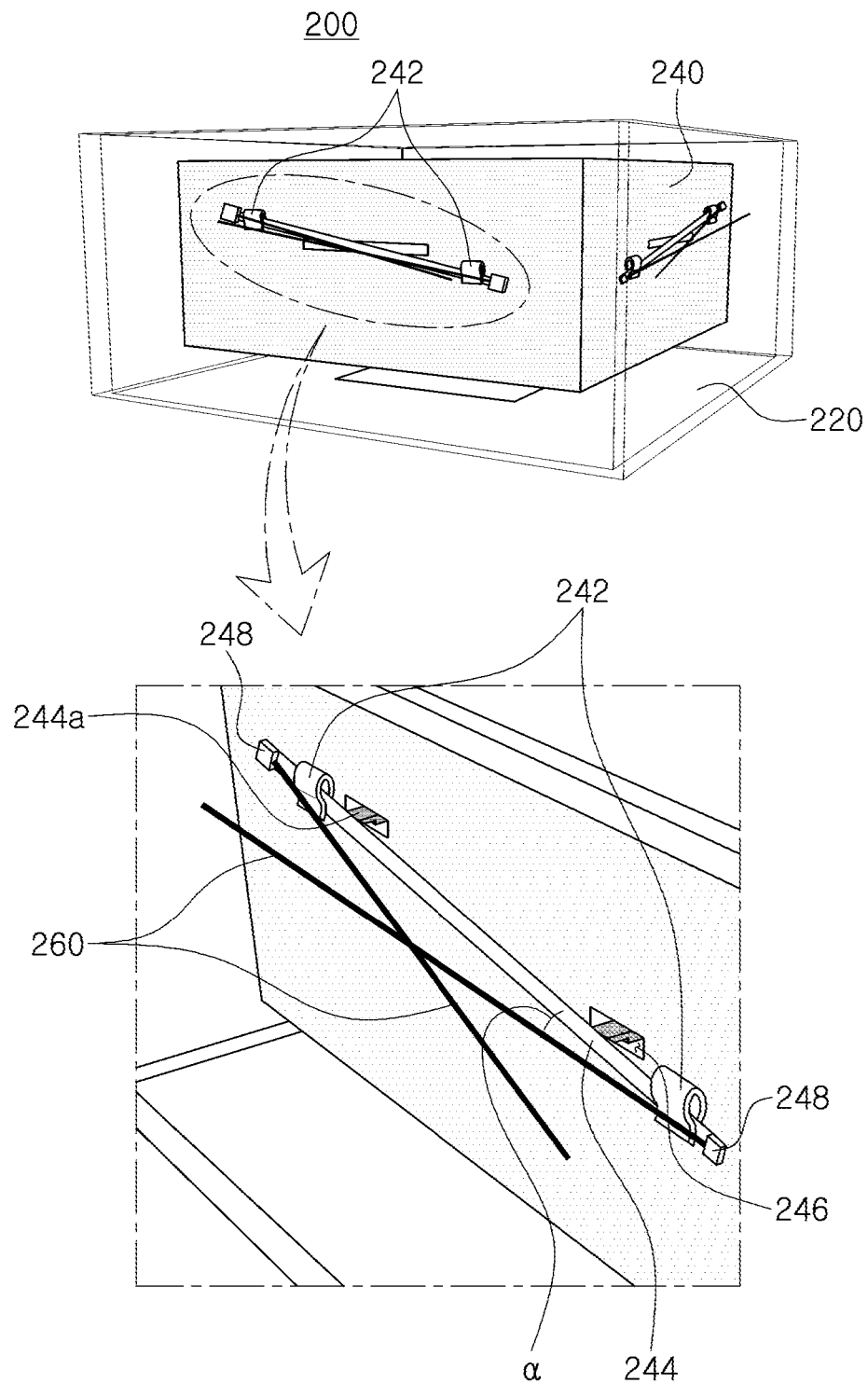
FIG. 7 is a schematic perspective view of another example of a camera module.
Figure 8:
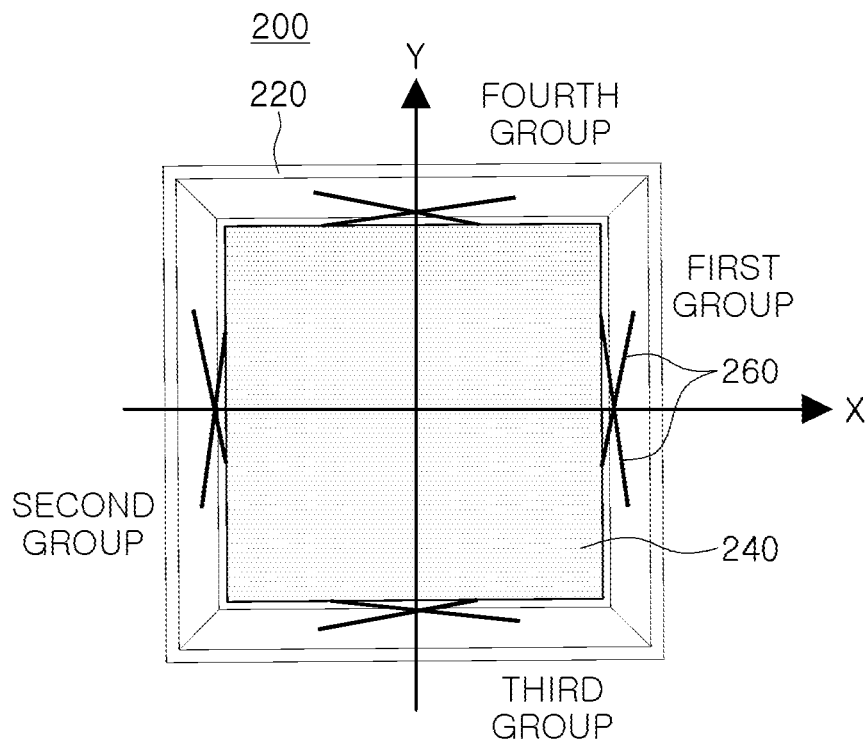
FIG. 8 is a plan view of driving wires in the camera module of FIG. 7.

FIG. 7 is a schematic perspective view of another example of a camera module, and FIG. 8 is a plan view of driving wires in the camera module of FIG. 7.

Referring to FIGS. 7 and 8, a camera module 200 includes a support structure 220, a movable body 240, and driving wires 260.

The support structure 220 has an internal space. As an example, the support structure 220 has a hexahedral shape with a top and a bottom that are at least partially open. As an example, the support structure 220 is a housing, and may be fixedly mounted on a printed circuit board, not illustrated, or other mounting surface.

Each internal side surface of the support structure 220 is provided with installation tools, not illustrated, to which driving wires 260 are connected.

The movable body 240 is movably disposed in the internal space of the support structure 220. As an example, the movable body 240 may be a lens barrel in which a plurality of lenses, not illustrated, are mounted. The movable body 240 has a substantially hexahedral shape. Each side surface of the movable body 240 is provided with a pair of clips 242 and a support member 244 slidably mounted in the clips 242. The support member 244 has at least one projection 244a inserted into at least one guide hole 246 formed in each side surface of the movable body 240.

One projection 244a may be inserted into a single guide hole 246 in the side surface of the movable body 240 as illustrated in the top portion of FIG. 7, or a plurality of projections 246a may be inserted into a plurality of guide holes 246 in the side surface of the movable body 240 as illustrated in the bottom portion of FIG. 7.

A plurality of driving wires 260 are provided. Each driving wire 260 has one end connected to the support structure 220, and another end connected to the movable body 240. The driving wire 260 is made of a shape-memory alloy. As an example, among the plurality of driving wires 260, a pair of driving wires 260 constitutes one group of driving wires 260, and four groups of driving wires 260 are provided, with one group disposed on each side of the movable body 240.

As an example, each driving wire 260 has one end connected to an installation tool, not illustrated, disposed on an internal side surface of the support structure 220, and another end connected to a mounting tool 248 disposed on one end of the support member 244. The driving wires 260 are disposed so that two driving wires 260 cross each other between the internal side surface of the support structure 220 and the side surface of the movable body 240. Each of the driving wires 260 is operable to move the movable body 240 in one axis direction, such as an X-axis direction, a Y-axis direction, or a Z-axis direction. That is, each of the driving wires 260 is not operable to move the movable body 240 in two or more axis directions, but is operable to move the movable body 240 in only one axis direction.

An angle α between the movable body 240 and each driving wire 260 is maintained at 15.5° or less at all positions to which the movable body 240 is movable. For example, assuming that a length of the driving wire 260 is the hypotenuse of a right triangle, the length of the driving wire 260 projected onto a plane parallel to an internal side surface of the support structure 220 is one leg of the right triangle, and a length of a gap between the movable body 240 and the support structure 220 is the other leg of the right triangle, an angle α between the driving wire 260 and the side surface of the movable body 240 as illustrated in FIG. 7 is maintained at 15.5° or less at all positions to which the movable body 240 is movable.

Referring to FIG. 8, when a first group of driving wires 260 are contracted and a second group of driving wires 260 are relaxed, a first support member 244 to which the first group of driving wires 260 are connected and a second support member 244 to which the second group of driving wires 260 are connected move the movable body 240 to the right in the X-axis direction. In contrast, a third group of driving wires 260 and a fourth group of driving wires 260 are not contracted or relaxed as the movable body 240 moves to the right in the X-axis direction, and hold stationary a third support member 244 to which the third group of driving wires 260 are connected and a fourth support member 244 to which the fourth group of driving wires 260 are connected as the movable body 240 moves to the right in the X-axis direction and the clips 242 provided on the side surfaces of the movable body 240 and in which the third and fourth support members 244 are slidably mounted slide along the third and fourth support members 244. The guide hole(s) 246 in the movable body 240 slide along the projection(s) 244a of the third and fourth support members 244 as the clips 242 slide along the third and fourth support members 244 to stabilize the movement of the movable body 240. Thus, the support members 244 slidably mounted in the clips 242 enable the first and second groups of driving wires 260 to be used only to move the movable body 240 in the X-axis direction, and the third and fourth groups of driving wires 260 to be used only to move the movable body 240 in the Y-axis direction.

Figure 9:
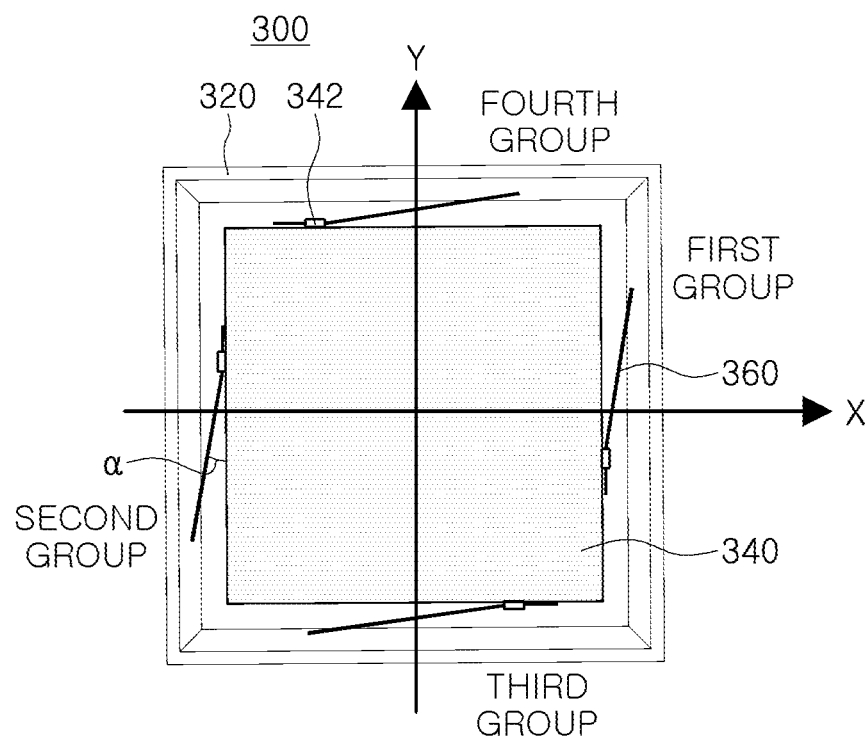
FIG. 9 is a plan view of driving wires in another example of a camera module.

FIG. 9 is a plan view of driving wires in another example of a camera module.

Referring to FIG. 9, a camera module 300 includes a support structure 320, a movable body 340, and driving wires 360.

The support structure 320 has an internal space. As an example, the support structure 320 has a hexahedral shape with a top and a bottom that are at least partially open. As an example, the support structure 320 is a housing, and may be fixedly mounted on a printed circuit board, not illustrated, or other mounting surface.

Each internal side surface of the support structure 320 is provided with installation tools, not illustrated, to which driving wires 360 are connected.

The movable body 340 is movably disposed in the internal space of the support structure 320. As an example, the movable body 340 may be a lens barrel in which a plurality of lenses, not illustrated, are mounted. The movable body 340 has a substantially hexahedral shape. The movable body 340 is provided with mounting tools 342 to which the driving wires 360 are connected. One mounting tool 342 is provided on each of left, right, top, and bottom side surfaces of the movable body 340.

A plurality of driving wires 360 are provided. Each driving wire 360 has one end connected to the support structure 320, and another end connected to the movable body 340. The driving wire 360 is made of a shape-memory alloy. As an example, each of the plurality of driving wires 360 is connected to the movable body 340. FIG. 9 shows that the driving wires 360 are divided into first, second, third, and fourth groups on right, left, bottom, and top sides of the movable body 340, but each group includes only one driving wire 360.

As an example, each driving wire 360 has one end connected to an installation tool, not illustrated, disposed on an internal side surface of the support structure 320, and another end connected to one of the mounting tools 342 provided on one of the side surfaces of the movable body 340. Each of the driving wires 360 is operable to move the movable body 340 in one axis direction, such as an X-axis direction, a Y-axis direction, or a Z-axis direction. That is, each of the driving wires 360 is not operable to move the movable body 340 in two or more axis directions, but is operable to move the movable body 340 in only one axis direction.

The mounting tools 342 provided on the left and right side surfaces of the movable body 340 are slidably mounted so that the mounting tools 342 can slide only in the Y-axis direction, and the mounting tools 342 provided on the top and bottom side surfaces of the movable body 340 are slidably mounted so the mounting tools 342 can slide only in the X-axis direction.

When the driving wire 360 of the first group on the right side of the movable body 340 is contracted, the driving wire 360 of the second group on the left side of the movable body 340 is relaxed, and the driving wires 360 of the third and fourth groups on the bottom and top sides of the movable body 340 are neither contracted nor relaxed, the movable body 340 moves to the right in the X-axis direction, and the mounting tools 342 on the bottom and top side surfaces of the movable body 340 are held in position by the driving wires 360 of the third and fourth groups that are neither contracted nor relaxed, so the mounting tools 342 on the bottom and top side surfaces slide relative to the movable body 340 in the X-axis direction.

When the driving wire 360 of the second group on the left side of the movable body 340 is contracted, the driving wire 360 of the first group on the right side of the movable body 340 is relaxed, and the driving wires 360 of the third and fourth groups on the bottom and top sides of the movable body 340 are neither contracted nor relaxed, the movable body 340 moves to the left in the X-axis direction, and the mounting tools 342 on the bottom and top side surfaces of the movable body 340 are held in position by the driving wires 360 of the third and fourth groups that are neither contracted nor relaxed, so the mounting tools 342 on the bottom and top side surfaces slide relative to the movable body 340 in the X-axis direction.

When the driving wire 360 of the third group on the bottom side of the movable body 340 is contracted, the driving wire 360 of the fourth group on the top side of the movable body 340 is relaxed, and the driving wires 360 of the first and second groups on the right and left sides of the movable body 340 are neither contracted nor relaxed, the movable body 340 moves downward in the Y-axis direction, and the mounting tools 342 on the right and left side surfaces of the movable body 340 are held in position by the driving wires 360 of the first and second groups that are neither contracted nor relaxed, so the mounting tools 342 on the right and left side surfaces slide relative to the movable body 340 in the Y-axis direction.

When the driving wire 360 of the fourth group on the top side of the movable body 340 is contracted, the driving wire 360 of the third group on the bottom side of the movable body 340 is relaxed, and the driving wires 360 of the first and second groups on the right and left sides of the movable body 340 are neither contracted nor relaxed, the movable body 340 moves upward in the Y-axis direction, and the mounting tools 342 on the right and left side surfaces of the movable body 340 are held in position by the driving wires 360 of the first and second groups that are neither contracted nor relaxed, so the mounting tools 342 on the right and left side surfaces slide relative to the movable body 340 in the Y-axis direction.

An angle α between the movable body 340 and each driving wire 360 is maintained at 15.5° or less at all positions to which the movable body 340 is movable. For example, assuming that a length of the driving wire 360 is the hypotenuse of a right triangle, the length of the driving wire 360 projected onto a plane parallel to an internal side surface of the support structure 320 is one leg of the right triangle, and a length of a gap between the movable body 340 and the support structure 320 is the other leg of the right triangle, an angle α between the driving wire 360 and the side surface of the movable body 340 as illustrated in FIG. 9 is maintained at 15.5° or less at all positions to which the movable body 340 is movable.

Figure 10:
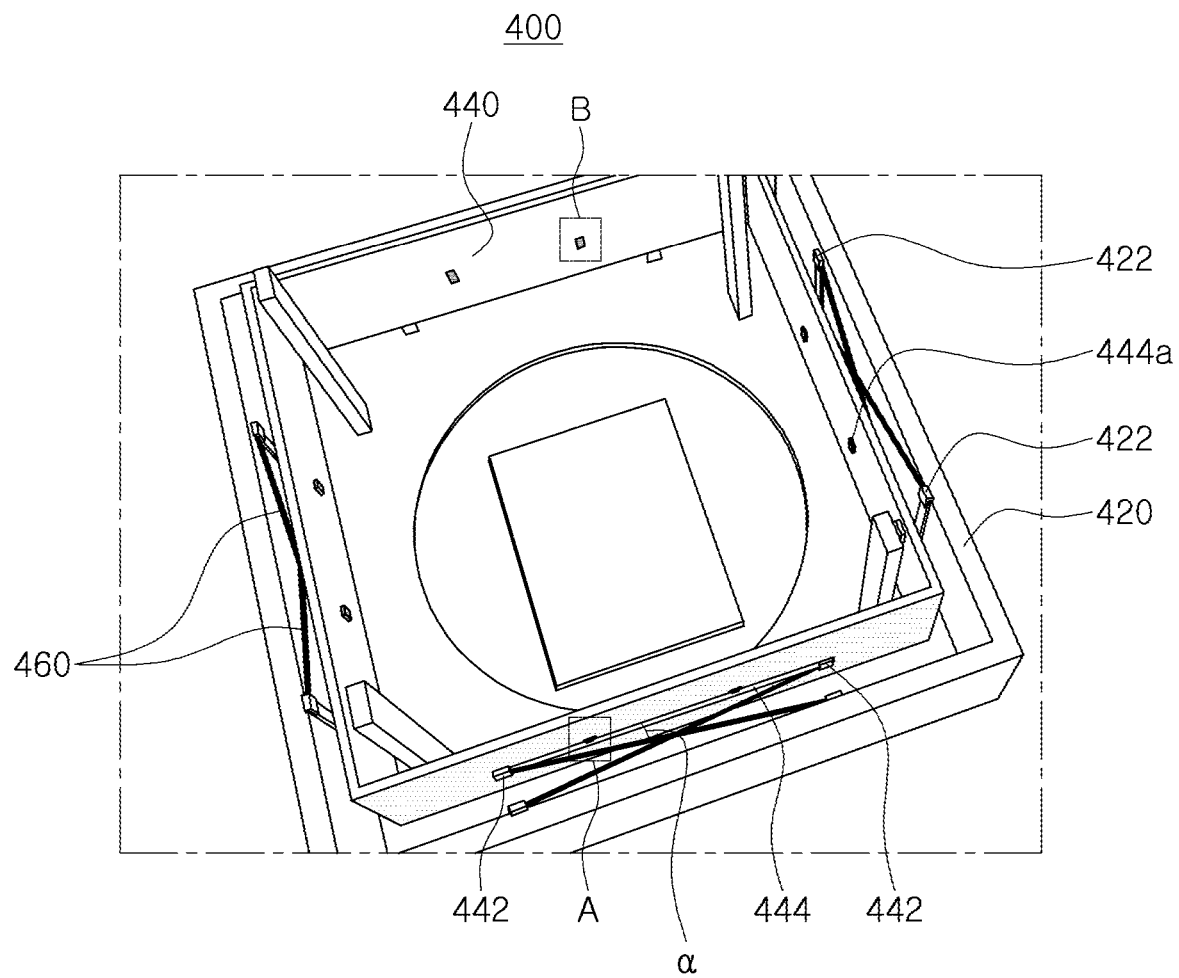
FIG. 10 is a schematic perspective view of another example of a camera module.
Figure 11:
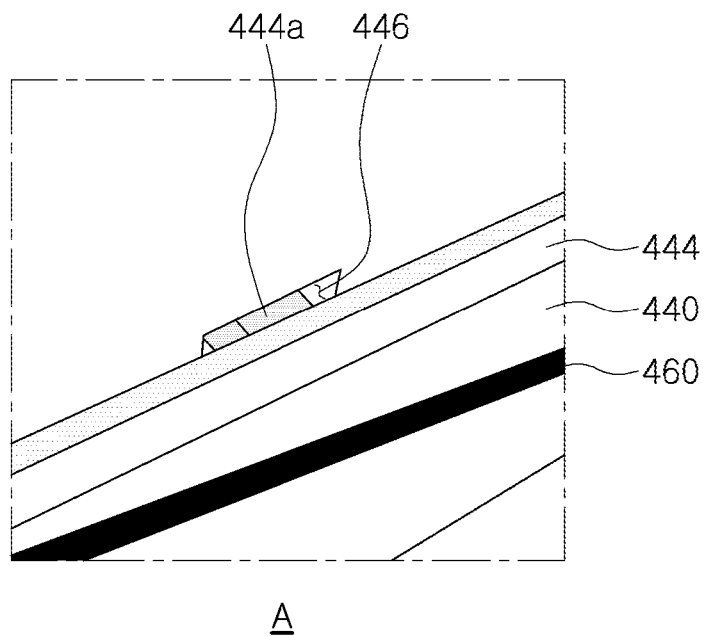
FIG. 11 is an enlarged perspective view of portion 'A' of FIG. 10.
Figure 12:
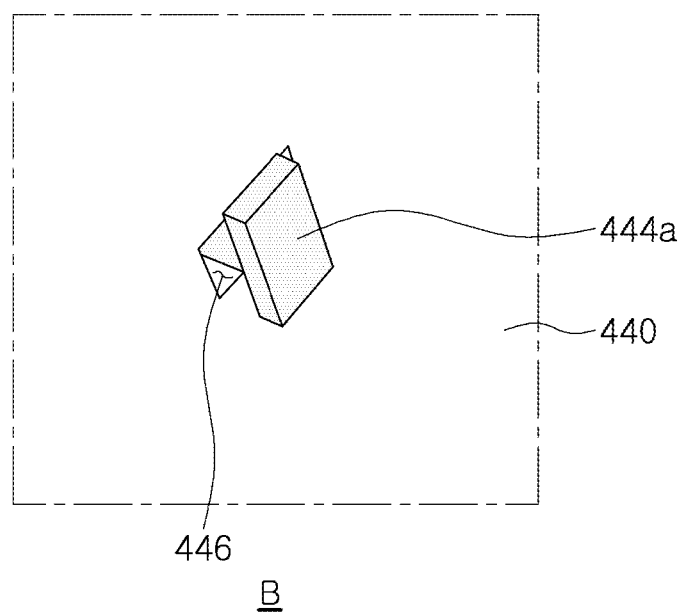
FIG. 12 is an enlarged perspective view of portion 'B' of FIG. 10.
Figure 13:
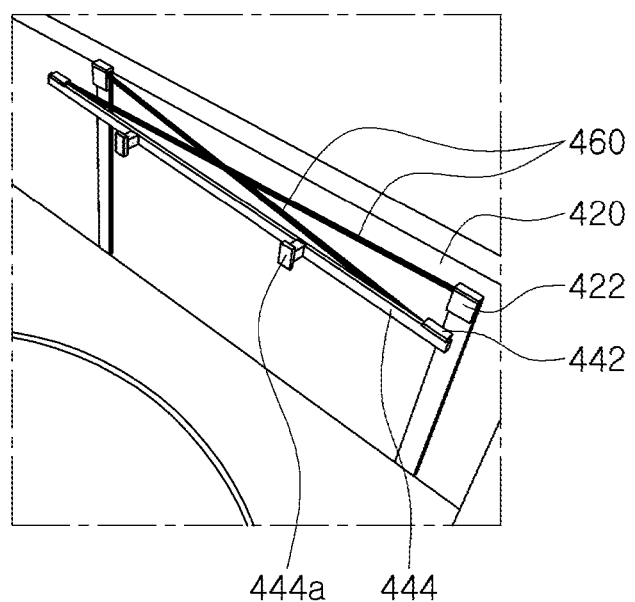
FIG. 13 is a perspective view illustrating how driving wires are mounted in the camera module of FIG. 10.

FIG. 10 is a schematic perspective view of another example of a camera module, FIG. 11 is an enlarged perspective view of portion 'A' of FIG. 10, FIG. 12 is an enlarged perspective view of portion 'B' of FIG. 10, and FIG. 13 is a perspective view illustrating how driving wires are mounted in the camera module of FIG. 10.

Referring to FIGS. 10 to 13, a camera module 400 includes a support structure 420, a movable body 440, and driving wires 460.

The support structure 420 has an internal space. As an example, the support structure 420 has a hexahedral shape with a top and a bottom that are at least partially open. As an example, the support structure 420 is a housing, and may be fixedly mounted on a printed circuit board, not illustrated, or other mounting surface.

Each internal side surface of the support structure 420 is provided with installation tools 422 to which driving wires 460 are connected.

The movable body 440 is movably disposed in the internal space of the support structure 420. As an example, the movable body 440 may be a lens barrel in which a plurality of lenses, not illustrated, are mounted. The movable body 440 has a substantially hexahedral shape. A support member 444 is mounted at a fixed position on each side surface of the movable body 440. Each end of the support member 444 is provided with a mounting tool 442 to which one of the driving wires 460 is connected. Each support member 444 has mounting projections 444a inserted into mounting holes 446 formed in each side surface of the movable body 440 to mount the support member 444 at a fixed position on the side surface of the movable body 440.

Each side surface of the movable body 440 may have a plurality of mounting holes 446 as shown in FIG. 10, or a single mounting hole 446.

A plurality of driving wires 460 are provided. Each driving wire 460 has one end connected to the support structure 420, and another end connected to the movable body 440. The driving wire 460 is made of a shape-memory alloy. As an example, among the plurality of the driving wire 460, a pair of driving wires 460 constitutes one group of driving wires 460, and four groups of driving wires 460 are provided, with one group disposed on each side of the movable body 340.

As an example, each driving wire 460 has one end connected to an installation tool 422 disposed on an internal side surface of the support structure 420, and another end connected to a mounting tool 442 disposed on an end of the support member 444. Two driving wires 460 are disposed so that they cross each other between the internal side surface of the support structure 420 and the side surface of the movable body 440. Each of the driving wires 460 is operable to move the movable body 440 in one axis direction, such as an X-axis direction, a Y-axis direction, or a Z-axis direction. That is, each of the driving wires 460 is not operable to move the movable body 440 in two or more axis directions, but is operable to move the movable body 440 in only one axis direction.

An angle α between the movable body 440 and each driving wire 460 is maintained at 15.5° or less at all positions to which the movable body 440 is movable. For example, assuming that a length of the driving wire 460 is the hypotenuse of a right triangle, the length of the driving wire 460 projected onto a plane parallel to an internal side surface of the support structure 420 is one leg of the right triangle, and a length of a gap between the movable body 440 and the support structure 420 is the other leg of the right triangle, an angle α between the driving wire 460 and the side surface of the movable body 440 as illustrated in FIG. 10 is maintained at 15.5° or less at all positions to which the movable body 440 is movable.

Figure 14:
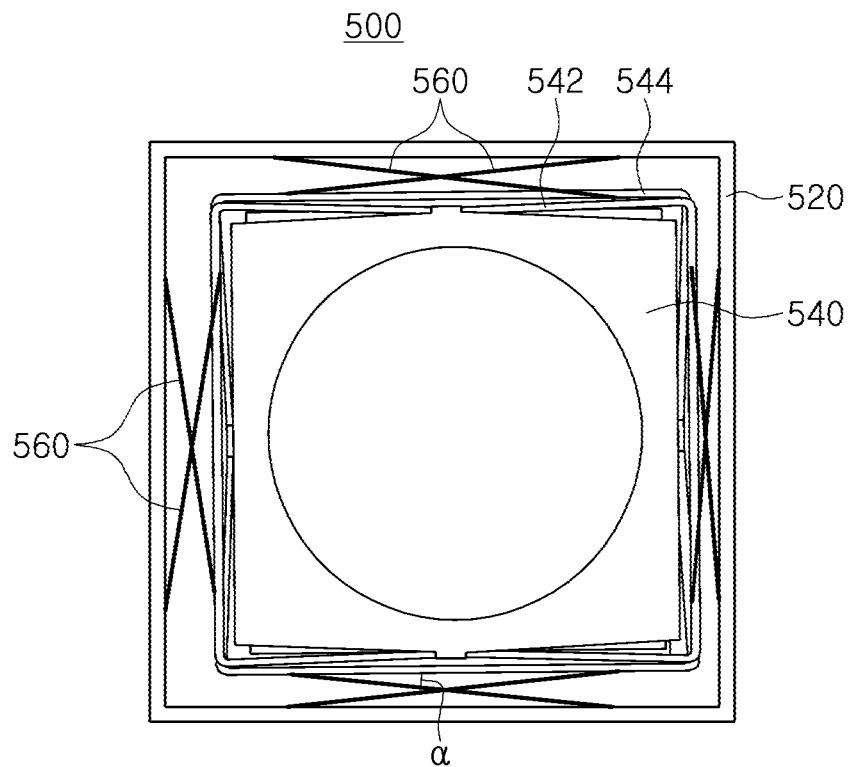
FIG. 14 is a plan view of another example of a camera module.
Figure 15:
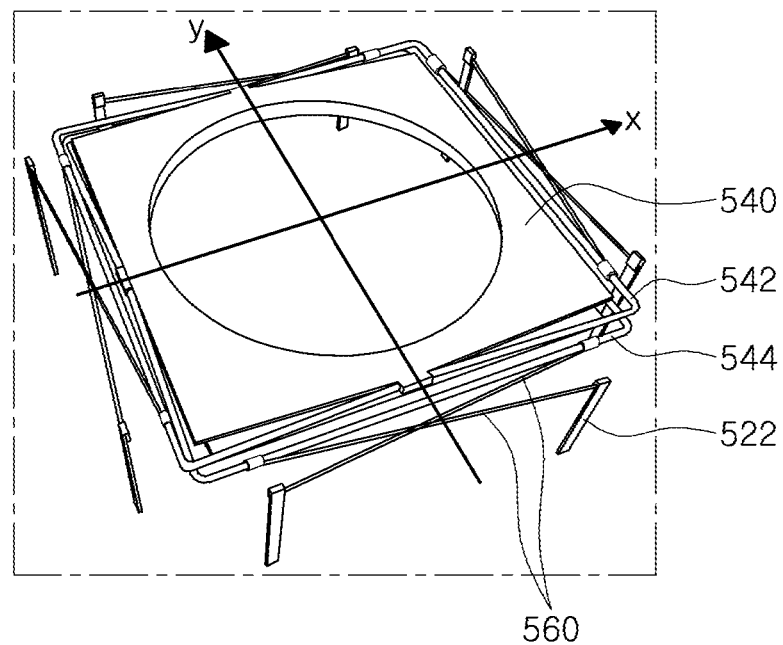
FIG. 15 is a perspective view of the camera module of FIG. 14.

FIG. 14 is a plan view of another example of a camera module, and FIG. 15 is a perspective view of the camera module of FIG. 14.

Referring to FIGS. 14 and 15, a camera module 500 includes a support structure 520, a movable body 540, and driving wires 560.

The support structure 520 has an internal space. As an example, the support structure 520 has a hexahedral shape with a top and a bottom that are at least partially open. As an example, the support structure 520 is a housing, and may be fixedly mounted on a printed circuit board, not illustrated, or other mounting surface.

Each internal side surface of the support structure 520 is provided with installation tools 522 to which the driving wires 560 are connected.

The movable body 540 is movably disposed in the internal space of the support structure 520. As an example, the movable body 540 may be a lens barrel in which a plurality of lenses, not illustrated, are mounted. The movable body 540 has a substantially hexahedral shape. A first spring member 542 is connected to a first side and a second side of the movable body 540 opposing each other, and a second spring member 544 is connected to a third side and a fourth side of the movable body 540 opposing each other.

As an example, each of the first and second spring members 542 and 544 has a rectangular annular shape and surrounds the movable body 560.

A plurality of driving wires 560 are provided. Each driving wire 560 has one end connected to the support structure 520, and another end connected to the first spring member 542 or the second spring member 544. The driving wires 560 are made of a shape-memory alloy. As an example, among the plurality of the driving wire 560, a pair of driving wires 560 constitutes one group of driving wires 560, and four groups of driving wires 560 are provided, with one group disposed on each side of the movable body 540.

Each driving wire 560 connected to the first spring member 542 is connected to a portion of the first spring member 542 opposing the third side or the fourth side of the movable body 540 to which the second spring member 542 is connected. Each driving wire 560 connected to the second spring member 544 is connected to a portion of the second spring member 544 opposing the first side or the second side of the movable body 540 to which the first spring member 544 is connected.

As an example, each driving wire 560 has one end connected to an installation tool 522 disposed on an internal side surface of the support structure 520, and another end connected to the first spring member 542 or the second spring member 544. The driving wires 560 are disposed so that two driving wires 560 cross each other between the internal side surface of the support structure 520 and the side surface of the movable body 540. Each of the driving wires 560 is operable to move the movable body 540 in one axis direction, such as an X-axis direction, a Y-axis direction, or a Z-axis direction. That is, each of the driving wires 560 is not operable to move the movable body 540 in two or more axis directions, but is operable to move the movable body 540 in only one axis direction.

An angle α between the first spring member 542 or the second spring member 544 attached to the movable body 540 and each driving wire 560 is maintained at 15.5° or less at all positions to which the movable body 540 is movable. For example, assuming that a length of the driving wire 560 is the hypotenuse of a right triangle, the length of the driving wire 560 projected onto a plane parallel to an internal side surface of the support structure 520 is one leg of the right triangle, and a length of a gap between the first spring member 542 or the second spring member 544 attached to the movable body 540 and the support structure 520 is the other leg of the right triangle, an angle α between the driving wire 560 and the first spring member 542 or the second spring member 544 attached to the movable body 540 is maintained at 15.5° or less at all positions to which the movable body 540 is movable.

In the examples described above, driving wires made of a shape-memory alloy that are operable to move a lens barrel (a movable body) enable a size and a manufacturing cost of a camera module to be reduced.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module comprising:
a support structure having an internal space;
a movable body disposed in the internal space of the support structure; and
a plurality of driving wires supporting the movable body in the internal space of the support structure and configured to move the movable body relative to the support structure, each of the driving wires being made of a shape-memory alloy and having one end connected to the support structure, and another end connected to the movable body,
wherein an angle between the movable body and each of the driving wires is maintained at 15.5° or less at all positions to which the movable body is movable by the driving wires.

2. The camera module of claim 1, wherein the driving wires comprise four groups of driving wires, and each of the groups of driving wires comprises two driving wires.

3. The camera module of claim 2, wherein each of the two driving wires of each of the four groups of driving wires has the one end connected to an internal side surface or a bottom surface of the support structure, and the other end connected to a side surface of the movable body near or adjacent to an upper edge of the movable body.

4. The camera module of claim 2, further comprising a ball disposed between a bottom surface of the support structure and the movable body.

5. The camera module of claim 2, wherein the movable body has a plurality of side surfaces, and comprises:
a plurality of pairs of clips, each of the pairs of clips being disposed on a respective one of the side surfaces of the movable body; and
a plurality of support members each being slidably mounted in a respective pair of the pairs of clips,
wherein each of the driving wires has the one end connected to the support structure, and the other end connected to a respective end of a respective one of the support members.

6. The camera module of claim 5, wherein an angle between each of the driving wires and the support member is maintained at 15.5° or less at all positions to which the movable body is movable by the driving wires.

7. The camera module of claim 5, wherein each of the side surfaces of the movable body has a guide hole formed therein, and
each of the support members comprises a projection inserted into the guide hole formed in a respective one of the side surfaces of the movable body.

8. The camera module of claim 2, wherein the movable body has a plurality of side surfaces, and comprises a plurality of support members each mounted at a fixed position on a respective one of the side surfaces of the movable body,
wherein each of the driving wires has the one end connected to the support structure, and the other end connected to a respective one of the support members.

9. The camera module of claim 8, wherein each of the side surfaces of the movable body has a mounting hole formed therein, and
each of the support members comprises a mounting projection inserted into the mounting hole formed in a respective one of the side surfaces of the movable body to mount the support member at the fixed position on the side surface of the movable body.

10. The camera module of claim 2, wherein the movable body has four sides, and comprises:
a first spring member connected to a first side and a second side of the movable body opposing each other; and
a second spring member connected to a third side and a fourth side of the movable body opposing each other,
wherein first driving wires of the driving wires have the one end connected to the support structure, and the other end connected to the first spring member, and
second driving wires of the driving wires have the one end connected to the support structure, and the other end connected to the second spring member.

11. The camera module of claim 10, wherein each of the first spring member and the second spring member has a rectangular annular shape and surrounds the movable body.

12. The camera module of claim 10, wherein the other end of each of the driving wires connected to the first spring member is connected to a respective portion of the first spring member opposing the third side or the fourth side of the movable body to which the other end of the second spring member is connected, and the other end of each of the driving wires connected to the second spring member is connected to a respective portion of the second spring member opposing the first side or the second side of the movable body to which the other end of each of the first spring member is connected.

13. The camera module of claim 1, wherein the movable body has a plurality of side surfaces, and each of the driving wires is connected to a respective one of the side surfaces of the movable body so that each of the side surfaces of the movable body has a single one of the driving wires connected thereto.

14. The camera module of claim 13, wherein the movable body comprises a plurality of mounting tools each disposed on a respective one of the side surfaces of the movable body, and each of the driving wires is connected to a respective one of the mounting tools.

15. The camera module of claim 1, wherein a length of the driving wire projected onto a plane parallel to an internal side surface of the support structure is equal to 3.5 millimeters (mm), and a length of a gap between the movable body and the support structure ranges from 0.3 mm to 0.7 mm according to contraction and relaxation of each of the driving wires.

16. A camera module comprising:
a support structure having an internal space;
a movable body disposed in the internal space of the support structure;
a plurality of driving wires supporting the movable body in the internal space of the support structure and configured to move the movable body relative to the support structure, each of the driving wires being made of a shape-memory alloy and having one end connected to the support structure, and another end connected to the movable body; and
a ball disposed between a surface of the support structure and the movable body,
wherein each of the driving wires is configured to be elongated to move the movable body in one of three axis directions.

17. A camera module comprising:
a support structure having an internal space;
a movable body disposed in the internal space of the support structure;
a plurality of driving wires supporting the movable body in the internal space of the support structure and configured to move the movable body in a first axis direction and a second axis direction relative to the support structure, each of the driving wires being made of a shape-memory alloy and having one end connected to the support structure, and another end connected to the movable body; and
a ball disposed between a surface of the support structure and the movable body,
wherein first driving wires of the driving wires are operable to move the movable body only in the first axis direction, and
second driving wires of the driving wires are operable to move the movable body only in the second axis direction.

18. The camera module of claim 17, wherein the other ends of the first driving wires are connected to the movable body so that the first driving wires do not move as the second driving wires move the movable body in the second axis direction, and the other ends of the second driving wires are connected to the movable body so that the second driving wires do not move as the first driving wires move the movable body in the first axis direction.

19. The camera module of claim 18, wherein the movable body has a first side surface and a second side surface on opposite sides of the movable body and oriented perpendicular to the first axis direction, and a third side surface and a fourth side surface on opposite sides of the movable body and oriented perpendicular to the second axis direction, the movable body comprises four support members each slidably mounted on a respective one of the first, second, third, and fourth side surfaces of the movable body, the first driving wires comprise two driving wires having their other ends connected to opposite ends of the support member slidably mounted on the first side surface of the movable body, and two driving wires having their other ends connected to opposite ends of the support member slidably mounted on the second side surface of the movable body, and the second driving wires comprise two driving wires having their other ends connected to opposite ends of the support member slidably mounted on the third side surface of the movable body, and two driving wires having their other ends connected to opposite ends of the support member slidably mounted on the fourth side surface of the movable body.

20. The camera module of claim 19, wherein the support members slidably mounted on the first and second side surfaces of the movable body are configured to slide relative to the movable body to remain stationary relative to the support structure as the second driving wires move the movable body in the second axis direction, and the support members slidably mounted on the third and fourth side surfaces of the movable body are configured to slide relative to the movable body to remain stationary relative to the support structure as the first driving wires move the movable body in the first axis direction.

* * * * *